Figure 1:
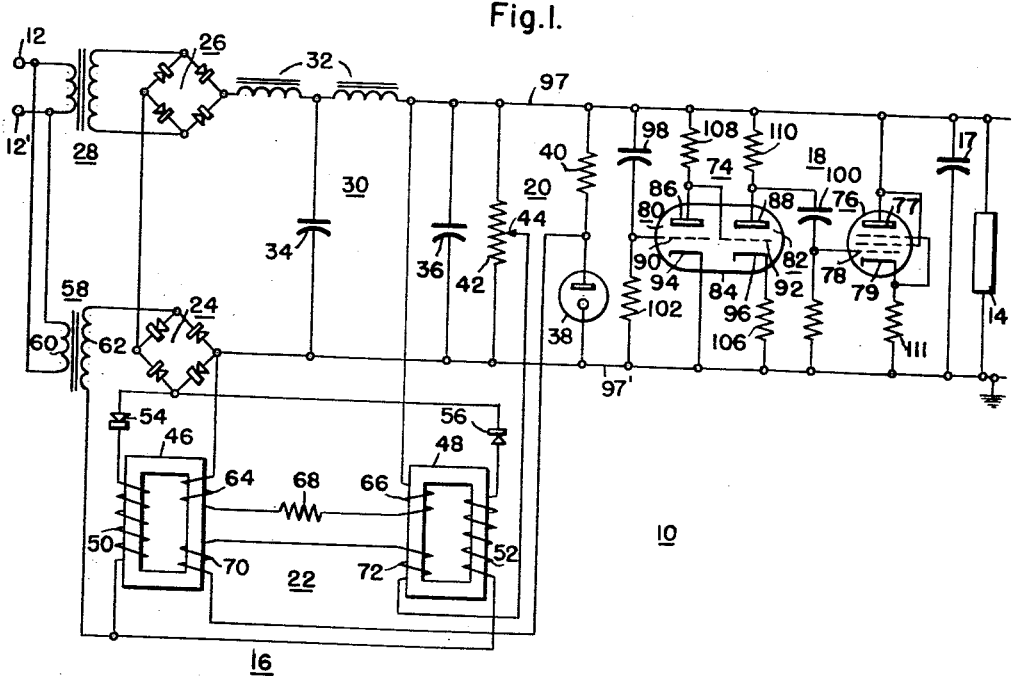

Dec. 17, 1957   M. J. TAUBENSLAG ET AL   2,817,055
REGULATORS
Filed Sept. 14, 1954

WITNESSES:
E. A. McCloskey.
K. W. Thomas

INVENTORS
Morris J. Taubenslag
and Melvin P. Siedband.
BY
Gerald W. Savage
ATTORNEY

United States Patent Office 2,817,055
Patented Dec. 17, 1957

2,817,055

REGULATORS

Morris J. Taubenslag and Melvin P. Siedband, Baltimore, Md., assignors to Westinghouse Electric Corporation, East Pittsburgh, Pa., a corporation of Pennsylvania Application September 14, 1954, Serial No. 455,956

5 Claims. (Cl. 321—23)

This invention relates to regulators and, more particularly, to regulated power supplies for maintaining an output voltage substantially constant.

Heretofore, many types of regulated power supplies have been utilized. For instance, regulation has been accomplished by inserting a variable impedance, i. e., regulator tubes in series or in parallel with the load. However, such tubes are large, require filament currents of large magnitude, and in operation operate at a relatively high temperature. A power supply incorporating conventional series regulator tubes constantly requires service as the tubes age and burn out.

Magnetic amplifier regulators have a number of advantages. However, they also have certain limitations. Magnetic amplifiers are rugged, have a relatively long life, have excellent stability, and are small for the amount of current that they can control. However, for many applications, magnetic amplifier regulators have too long a response time.

A relatively effective regulator can be provided by connecting a dry-type capacitor across the output of a magnetic amplifier regulator. The dry-type capacitor would then respond to changes in voltage of relatively short duration, thus leaving the magnetic amplifier to respond to voltage changes of relatively longer duration. However, if such a dry-type capacitor were to be connected across the output of a magnetic amplifier regulator in order to be effective, it would have to be extremely large in size, that is have a value of several hundred microfarads. On the other hand, high temperatures prohibit use of an electrolytic condenser across the output of the magnetic amplifier regulator.

An object of this invention is to provide for effectively and economically regulating a power supply for transients and noise as produced by the regulator, as received from the input circuit, and as produced by load changes.

Another object of this invention is to provide for effectively and economically regulating a power supply for changes in load current of relatively long duration, as well as for transients and noise as produced by the regulator, as received from the input circuit, and as produced by load changes.

A further object of this invention is to provide for effectively regulating a power supply for step functions of load, by so coordinating a noise and transient reducer circuit with a magnetic amplifier regulator that the noise and transient reducer circuit reduces step functions of load to a form that the magnetic amplifier regulator can handle with its slower speed of response.

Figure 2:
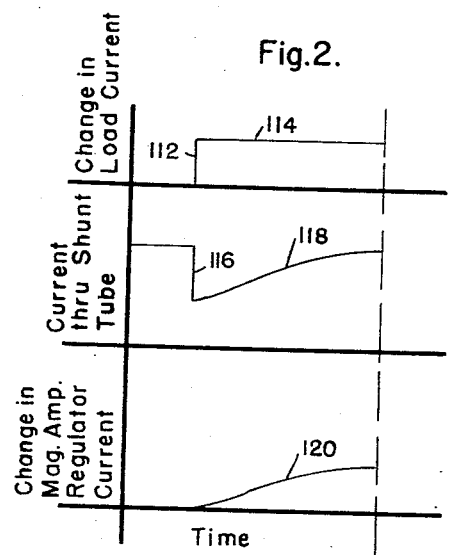

Other objects of this invention will become apparent from the following description when taken in conjunction with the accompanying drawing, in which:

Fig. 1 is a schematic diagram of a regulated power supply embodying the teachings of this invention; and Fig. 2 is a graph illustrating the manner in which the magnetic amplifier regulator and noise and transient reducer circuit, illustrated in Fig. 1, cooperates with one another to regulate for step functions of load.

Referring to Fig. 1, there is illustrated a regulated power supply 10 which is connected to be energized from a supply voltage appearing across input terminals 12 and 12', and which is connected to supply energy to a load 14 as well as maintain the magnitude of the voltage across the load 14 substantially constant. In general, the regulated power supply 10 comprises a magnetic amplifier regulator 16 for responding to changes in voltage of relatively long duration, a capacitor 17 for responding to changes in voltage of extremely short duration, and a noise and transient reducer circuit 18, hereinafter called the shunt circuit, for responding to voltage changes of duration intermediate that which the components 16 and 17 respond to. As will be explained more fully hereinafter, the magnetic amplifier regulator 16 and the shunt circuit 18 cooperate to maintain the magnitude of the voltage across the load 14 substantially constant irrespective of transients and noise as received from the input terminals 12 and 12', irrespective of transients and noise as received from the magnetic amplifier regulator 16 irrespective of transients and noise as produced by changes in the load 14, irrespective of gradual changes in the magnitude of the input voltage across the terminal 12 and 12', irrespective of gradual changes in the load 14, and irrespective of step functions of load.

In this instance, the magnetic amplifier regulator 16 comprises a Wheatstone bridge 20 which responds to deviations of the direct-current voltage across the load 14 from its regulated value and to deviations of the input supply voltage, appearing across the terminals 12 and 12', from its normal value. A self-saturating doubler-type magnetic amplifier 22, which is also included in the magnetic amplifier regulator 16, responds to the unbalance of the Wheatstone bridge 20 to thereby restore the magnitude of the voltage across the load 14 to its regulated value.

In order to provide a minimum size for the regulated power supply 10, two full-wave dry-type rectifiers 24 and 26 are provided. In this instance, the outputs of the rectifiers 24 and 26 are connected in series circuit relationship with one another, the series circuit being connected across the load 14. Thus, the controlled voltage appearing across the output of the rectifier 24 is added to the voltage appearing across the output of the rectifier 26, this latter voltage being produced by applying the input voltage to the input terminals of the rectifier 26 by means of a potential transformer 28.

In order to remove the steep wave front from each cycle of the magnetic amplifier output, an inductive-type filter 30 is connected across the series-connected outputs of the rectifiers 24 and 26. The filter 30 also functions as a ripple reducer and has good rectifier regulating characteristics. The inductive-type filter 30 also permits improved performance from the magnetic amplifier 22 resulting in higher gain. In this instance, the filter 30 comprises chokes 32, and capacitors 34 and 36.

The Wheatstone bridge 20 comprises a voltage-regulator tube 38 having a constant voltage characteristic, and linear resistors 40 and 42, the resistor 42 being provided with a movable contact member 44 for adjusting the magnitude of the output voltage of the magnetic amplifier regulator 16 and thus the magnitude of the voltage appearing across the load 14. As illustrated, the four legs of the Wheatstone bridge 20 comprise the voltage-regulator tube 38, the resistor 40, and the two proportions of the resistor 42 as divided by the movable contact member 44.

Referring more particularly to the magnetic amplifier 22, the amplifier comprises rectangular magnetic core members 46 and 48 which have disposed in inductive relationship therewith load windings 50 and 52, respectively. In order to produce self-saturation for the magnetic amplifier 22, self-saturating rectifiers 54 and 56 are connected in series circuit relationship with the load windings 50 and 52, respectively. As illustrated, the series circuit, including the load winding 50 and the self-saturating rectifier 54, is connected in parallel circuit relationship with the series circuit, including the load winding 52 and the self-saturating rectifier 56, to thereby establish a doubler-type circuit. Energy for the load windings 50 and 52 is received from a potential transformer 58 having a primary winding 60 and a secondary winding 62. In particular, the primary winding 60 is connected to the input terminals 12 and 12'. On the other hand, the secondary winding 62 of the potential transformer 58 is interconnected with the rectifier 24 and with the hereinbefore mentioned parallel circuit in a customary manner so as to provide the required energy for the load windings 50 and 52.

In order to bias the magnetic core members 46 and 48 to their unsaturated condition, bias windings 64 and 66 are disposed in inductive relationship with the magnetic core members 46 and 48, respectively. Thus, in practice, the bias windings 64 and 66 are so disposed on their respective magnetic core members 46 and 48 that the current flow therethrough produces a flux in the respective magnetic core members that opposes the flux produced by the current flow through the associated load windings 50 and 52. As illustrated, energy for the bias windings 64 and 66 is obtained by connecting the bias windings 64 and 66 in series-circuit relationship with one another and with a current-limiting resistor 68, the series circuit being connected across the load 14. If the bias winding circuit is eliminated a small additional current will flow in the control windings 70 and 72 producing a "self bias."

For the purpose of rendering the magnetic amplifier 22 responsive to the unbalance of the Wheatstone bridge 20, the control windings 70 and 72 are disposed in inductive relationship with the magnetic core members 46 and 48, respectively. In particular, the control windings 70 and 72 are connected in series-circuit relationship with one another, one end of the series circuit being connected to the movable contact member 44 and the other end of the series circuit being connected to the junction point of the resistor 40 and the voltage-regulator tube 38. In practice, the control windings 70 and 72 are so disposed on their respective magnetic core members 46 and 48 that when the magnitude of the voltage across the load 14 increases, the current flow through the control windings 70 and 72 produces a flux in the respective magnetic core members that opposes the flux produced by the current flow through the associated load windings 50 and 52, respectively.

Referring more particularly to the shunt circuit 18, the shunt circuit comprises an amplifier stage 74, and an electronic shunt control tube 76 having a plate 77, a control electrode 78, and a cathode 79. In this instance the shunt tube 76 is a triode-connected pentode-type vacuum tube.

In operation, the amplifier stage 74 responds to instantaneous changes in the voltage appearing across the load 14 as produced by load changes, to instantaneous changes in the magnitude of the supply voltage appearing across the input terminals 12 and 12', and to instantaneous changes in voltage as produced by the magnetic amplifier regulator 16. The amplified output of the amplifier stage 74 is then applied to the control electrode or grid 78 of the shunt tube 76, to thereby vary the magnitude of the current flow through the tube 76 in accordance with the instantaneous change in voltage and thus offset such instantaneous changes, and thereby maintain the magnitude of the voltage across the load 14 substantially constant irrespective of such instantaneous changes in voltage.

As illustrated, the amplifier stage 74 comprises two triode vacuum tubes 80 and 82 which are disposed within a common envelope 84, both triodes functioning as a phase inverter and as an amplifier. However, the triode 82 functions primarily as a phase inverter while the triode 80 functions as the main source of amplification for the amplifier stage 74. The net effect of this double triode circuit is to permit high gain with very small phase shift within its frequency range. As illustrated, the triodes 80 and 82 comprise plates 86 and 88, respectively, control electrodes or grids 90 and 92, respectively, and cathodes 94 and 96, respectively.

In order that the shunt circuit 18 will respond to only instantaneous changes of voltage, the control electrodes 90 and 78 of the tubes 80 and 76, respectively, are coupled to conductors 97 and 97' by means of the capacitors 98 and 100, respectively. On the other hand, grid bias for tube 80 is obtained by contact bias at the grid resistor 102. Bias for tube 76 is obtained by cathode bias resistor 111.

It is to be noted that the plate 86 of the triode 80 is directly connected to the control electrode 92 of the triode 82. Such being the case, the size of the coupling capacitors 98 and 100 can be a minimum and objectionable phase shift, which might cause oscillations, is prevented.

Since the plate 86 of the triode 80 is directly connected to the control electrode 92 of the triode 82, the cathode 96 of the triode 82 must be maintained at substantially the same potential as the plate 86 of the triode 80, in order that the triode 82 can be properly controlled. This is accomplished by connecting a resistor 106 of relatively large value between the cathode 96 and the conductor 97', thus producing cathode follower action sufficient for maintaining proper bias. On the other hand, the current flow through the triodes 80 and 82 is held to within the plate current ratings for the triodes 80 and 82 by connecting plate resistors 108 and 110 between their respective plates 86 and 88 and the conductor 97.

For the purpose of preventing the current flow through the shunt tube 76 from exceeding the plate current rating of the tube 76, a current-limiting resistor 111 is connected between the cathode 79 of the tube 76 and the conductor 97'. This also serves to provide cathode bias for tube 76. As illustrated, the series circuit, including the shunt tube 76 and the resistor 111, is connected in parallel circuit relationship with the load 14.

In operation, the transients and noise, as produced by the magnetic amplifier 22, manifest themselves as generated current variations which, in turn, cause small voltage changes across the series circuit including the coupling capacitor 98 and the grid resistor 102. Of course, these transients and noise are first partially attenuated by the filter 30. Assuming the transients or noise amount to an instantaneous increase in the voltage appearing across the series circuit including the coupling capacitor 98 and the grid resistor 102, then the conductivity of the triode 80 is increased. An increase in the conductivity of the triode 80 lowers the potential of the plate 86 of the triode 80 with respect to the conductor 97', and since the plate 86 is directly connected to the control electrode 92 of the triode 82, the potential of the control electrode 92 is likewise lowered with respect to the conductor 97'. When the potential of the control electrode 92 is lowered, the conductivity of the triode 82 is decreased, thereby increasing the potential of the plate 88 of the triode 82 with respect to the conductor 97'. This, in turn, increases the conductivity of the shunt tube 76 in opposition to the current changes of the transients or noise produced by the magnetic amplifier 22. The net effect is that practically no change in the magnitude of the voltage across the load 14 can be detected.

Noise and transients received from the input terminals 12 and 12', and noise and transients produced by a change in the load 14 are corrected for in the same manner as described above with reference to the noise and transients produced by the magnetic amplifier 22. Of course, noise and transients, as received from the input terminals 12 and 12', are partially attenuated by the filter 30 before being applied to the series circuit including the coupling capacitor 98 and the grid resistor 102.

Assuming the noise or transients as produced by the magnetic amplifier 22 effect an instantaneous decrease in the magnitude of the voltage across the series circuit including the coupling capacitor 98 and the grid resistor 102, then the conductivity of the triode 80 is decreased. A decrease in the conductivity of the triode 80 increases the potential of the plate 86 of the triode 80 with respect to the conductor 97' and thus the potential of the control electrode 92 of the triode 82 likewise increases with respect to the conductor 97'. Such an action increases the conductivity of the triode 82 and thus lowers the potential of the plate 88 of the triode 82 with respect to the conductor 97', thereby increasing the conductivity of the shunt tube 76. The increased conductivity of the shunt tube 76 acts in opposition to the current change as effected by the transients or noise and thus restores the magnitude of the voltage across the load 14 to the regulated value.

If the above-mentioned noise or transients are of extremely short duration, the capacitor 17 effects a short-circuiting of the shunt circuit 18, to thereby maintain the voltage across the load 14 substantially constant. On the other hand, if in operation the load 14 changes so as to produce a relatively gradual change in the magnitude of the voltage across the load 14, or if a relatively gradual change in the magnitude of the voltage across the terminals 12 and 12' occurs, the magnetic amplifier regulator 16 functions to correct for such relatively gradual changes. In particular, if the magnitude of the voltage across the Wheatstone bridge 20 increases due to, for instance, a relatively gradual increase in the magnitude of the voltage across the load 14, current flows through the control windings 72 and 70 of the magnetic amplifier 22 in such a direction as to produce a flux in the respective magnetic core members 48 and 46 in opposition to the flux produced by the current flow through the respective load windings 52 and 50. Such an action decreases the magnitude of the current flow through the load windings 50 and 52 and thus decreases the magnitude of the output voltage of the magnetic amplifier 22 as applied to the rectifier 24. This, in turn, decreases the combined output as produced by the rectifiers 24 and 26 and thus restores the voltage across the load 14 to its regulated value.

On the other hand, assuming the output voltage appearing across the conductors 97 and 97' gradually decreases to a value below the regulated value, then current flows in such a direction through the control windings 70 and 72 as to produce a flux in the respective magnetic core members 46 and 48 that aids the flux produced by the current flow through the respective load windings 50 and 52. Such an action increases the magnitude of the output voltage of the magnetic amplifier 22 as applied to the rectifier 24, to thereby increase the combined output as produced by the rectifiers 24 and 26, to thereby restore the output voltage across the load 14 to its regulated value.

Let us now consider step functions of load, such as when a resistor (not shown) is suddenly switched so as to become a part of the load 14. When such a resistor (not shown) is suddenly switched an instantaneous change in the magnitude of the load current takes place. Referring to Fig. 2, this instantaneous change in the magnitude of the load current is represented by a line 112. It is to be noted that once the resistor (not shown) has been switched, the load current remains at its new value for a relatively long period of time. This is illustrated by the horizontal line 114.

In the case of step functions of load, such as changes in load current, the leading edge of the change in current is handled as a transient by the shunt circuit 18 in a manner as described above. Thus, if the magnitude of the load current were to suddenly increase as a result of the resistor, not shown, being suddenly switched into the load 14, the shunt tube 76 would conduct less current. Such a decrease in the amount of current conducted by the shunt tube 76 is represented by the vertical line 116, as shown in Fig. 2.

Since the shunt circuit 18 is A.-C. connected, it exponentially returns to its static current rating as determined by the R-C time constant of the components 98 and 102. That is, once the current flow through the shunt tube 76 has decreased to a predetermined value, as illustrated in Fig. 2, the current flow through the shunt tube 76 exponentially increases, as shown by a curve 118, to its normal current rating. Such an action changes the voltage across the load 14 at the same rate. However, this rate of change of the current flow through the shunt tube 76 is slow enough for the magnetic amplifier regulator 16 to function to maintain the output voltage across the load 14 substantially constant. The manner in which the output current of the magnetic amplifier regulator 16 increases as the current flow through the shunt tube 76 exponentially increases to its normal value, is represented by a curve 120. Thus, by the time the current flow through the shunt tube 76 has returned to its normal value, as illustrated by the curve 118, the magnetic amplifier regulator 16 has had sufficient time to effect an increase in the magnitude of its output current, to thereby maintain the magnitude of the voltage across the load 14 substantially constant. In other words, the shunt circuit 18 reduces step functions of load to a form that the magnetic amplifier regulator 16 can handle with its slower speed of response. Thus, the magnetic amplifier regulator 16 and the shunt circuit 18 cooperate to produce the desired result.

It is to be understood that although a preferred type of magnetic amplifier regulator 16 is shown, other known types of magnetic amplifier regulators can be substituted therefor. It is also to be understood that although a preferred type shunt circuit 18 is illustrated, other known types of shunt circuits could be substituted for the shunt circuit 18.

The apparatus embodying the teachings of this invention has several advantages. For instance, effective regulation is maintained with apparatus of minimum size. In addition, the regulated power supply 10 has good stability, and maintains the magnitude voltage across the load 14 substantially constant irrespective of noise, transients, gradual changes in the magnitude of the load, gradual changes in the magnitude of the input voltage, and irrespective of step functions of load. Further, the regulated power supply 10 is economical to manufacture and requires but little maintenance.

Since certain changes may be made in the above apparatus and circuits, and different embodiments of the invention may be made without departing from the scope thereof, it is intended that all matter contained in the above description and shown in the accompanying drawing shall be interpreted as illustrative and not in a limiting sense.

We claim as our invention:

1. In a regulated power supply energized from a supply voltage and connected to supply energy to a load, the combination comprising, a magnetic amplifier regulator having an input and an output, the output of the magnetic amplifier regulator being interconnected with the load to vary the magnitude of the voltage across the load and the input of the magnetic amplifier regulator being connected to respond to deviations in the magnitude of the voltage across the load from its regulated value and to deviations in the magnitude of said supply voltage from its normal value, and a noise and transient reducer circuit including an electronic control tube having at least a plate, a control electrode, and a cathode, the plate and the cathode being interconnected with the load so as to connect the electronic control tube in parallel circuit relationship therewith, and the control electrode being connected to be responsive to the instantaneous change in magnitude of the voltage across the load and to a measure of the instantaneous change in the magnitude of said supply voltage, whereby the noise and transient reducer circuit reduces step functions of load to a form that the magnetic amplifier regulator can handle.

2. In a regulated power supply energized from a supply voltage and connected to supply energy to a load, the combination comprising, a magnetic amplifier regulator having an input and an output, the output of the magnetic amplifier regulator being interconnected with the load to vary the magnitude of the voltage across the load and the input of the magnetic amplifier regulator being connected to respond to deviations in the magnitude of the voltage across the load from its regulated value and to deviations in the magnitude of said supply voltage from its normal value, a noise and transient reducer circuit including an electronic control tube having at least a plate, a control electrode, and a cathode, the plate and the cathode being interconnected with the load so as to connect the electronic control tube in parallel circuit relationship therewith, and the control electrode being connected to be responsive to the instantaneous change in magnitude of the voltage across the load and to a measure of the instantaneous change in the magnitude of said supply voltage, whereby the noise and transient reducer circuit reduces step functions of load to a form that the magnetic amplifier regulator can handle, and a capacitor connected in parallel circuit relationship with the load.

3. In a regulated power supply energized from a supply voltage and connected to supply energy to a load, the combination comprising, two rectifiers each having an input and an output, the outputs of the rectifiers being connected in series circuit relationship, the load being connected to be energized in accordance with the voltage across said series circuit, and the inputs of the two rectifiers being connected to be energized from said supply voltage, a magnetic amplifier regulator having an input and an output, the output of the magnetic amplifier regulator being connected to the input of one of said two rectifiers, and the input of the magnetic amplifier regulator being energized in accordance with the magnitude of the voltage across the load and in accordance with a measure of the magnitude of said supply voltage, and a noise and transient reducer circuit including an electronic control tube having at least a plate, a control electrode, and a cathode, the plate and the cathode being interconnected with the load so as to connect the electronic control tube in parallel circuit relationship therewith, and the control electrode being connected to be responsive to the instantaneous change in magnitude of the voltage across the load and to a measure of the instantaneous change in the magnitude of said supply voltage, whereby the noise and transient reducer circuit reduces step functions of load to a form that the magnetic amplifier regulator can handle.

4. In a regulated power supply energized from a supply voltage and connected to supply energy to a load, the combination comprising, a magnetic amplifier regulator having an input and an output, the output of the magnetic amplifier regulator being interconnected with the load to vary the magnitude of the voltage across the load and the input of the magnetic amplifier regulator being connected to respond to deviations in the magnitude of the voltage across the load from its regulated value and to deviations in the magnitude of said supply voltage from its normal value, and a noise and transient reducer circuit including an electronic control tube having at least a plate, a control electrode, and a cathode, the plate and the cathode being interconnected with the load so as to connect the electronic control tube in parallel circuit relationship therewith, an amplifier stage including two other electronic tubes each having at least a plate, a control electrode and a cathode, the plate of one of said two other electronic tubes being directly connected to the control electrode of the other of the said two other electronic tubes, means for rendering the control electrode of said one of said two other electronic tubes responsive to the instantaneous change in the magnitude of the voltage across the load and to a measure of the instantaneous change in the magnitude of said supply voltage, and means for rendering the control electrode of said electronic control tube responsive to the output of said other of the said two other electronic tubes, whereby the noise and transient reducer circuit reduces step functions of load to a form that the magnetic amplifier regulator can handle.

5. In a regulated power supply energized from a supply voltage and connected to supply energy to a load, the combination comprising, two rectifiers each having an input and an output, the outputs of the rectifiers being connected in series circuit relationship, the load being connected to be energized in accordance with the voltage across said series circuit, and the inputs of the two rectifiers being connected to be energized from said supply voltage, a magnetic amplifier regulator having an input and an output, the output of the magnetic amplifier regulator being connected to the input of one of said two rectifiers, and the input of the magnetic amplifier regulator being energized in accordance with the magnitude of the voltage across the load and in accordance with the measure of the magnitude of said supply voltage, a noise and transient reducer circuit including an electronic control tube having at least a plate, a control electrode, and a cathode, the plate and the cathode being interconnected with the load so as to connect the electronic control tube in parallel circuit relationship therewith, an amplifier stage including two other electronic tubes each having at least a plate, a control electrode, and a cathode, the plate of one of said two other electronic tubes being directly connected to the control electrode of the other of said two other electronic tubes, means for rendering the control electrode of said one of said two other electronic tubes responsive to the instantaneous change in the magnitude of the voltage across the load and to a measure of the instantaneous change in the magnitude of said supply voltage, means for rendering the control electrode of said electronic control tube responsive to the output of said other of the said two other electronic tubes, and a capacitor connected in parallel circuit relationship with the load.

References Cited in the file of this patent

UNITED STATES PATENTS

| | | |
|---|---|---|
| 2,511,850 | Hoag | June 20, 1950 |
| 2,573,744 | Trucksess | Nov. 6, 1951 |
| 2,701,858 | Bakeman et al. | Feb. 8, 1955 |
| 2,771,576 | Meszaros | Nov. 20, 1956 |